(12) United States Patent
Graham et al.

(10) Patent No.: US 11,547,046 B2
(45) Date of Patent: Jan. 10, 2023

(54) LAWN MOWER WITH SELECTIVELY ROTATABLE CUTTING BLADES

(71) Applicant: HUSQVARNA AB, Huskvarna (SE)

(72) Inventors: Brad Graham, Harrisburg, NC (US);
Samuel Lattimore, Charlotte, NC (US);
David Baker, Fort Lawn, SC (US);
Jonathan Funk, Mooresville, NC (US)

(73) Assignee: HUSQVARNA AB, Huskvarna (SE)

( * ) Notice: Subject to any disclaimer, the term of this patent is extended or adjusted under 35 U.S.C. 154(b) by 0 days.

(21) Appl. No.: 17/600,487

(22) PCT Filed: Oct. 30, 2019

(86) PCT No.: PCT/IB2019/059309
§ 371 (c)(1),
(2) Date: Sep. 30, 2021

(87) PCT Pub. No.: WO2021/064454
PCT Pub. Date: Apr. 8, 2021

(65) Prior Publication Data
US 2022/0095535 A1 Mar. 31, 2022

Related U.S. Application Data

(60) Provisional application No. 62/908,095, filed on Sep. 30, 2019.

(51) Int. Cl.
*A01D 34/73* (2006.01)
*A01D 34/76* (2006.01)
*A01D 101/00* (2006.01)

(52) U.S. Cl.
CPC ........... *A01D 34/733* (2013.01); *A01D 34/76* (2013.01); *A01D 2101/00* (2013.01)

(58) Field of Classification Search
CPC .. A01D 2101/00; A01D 34/006; A01D 34/73; A01D 34/733; A01D 34/6806; A01D 34/82; A01D 34/76; A01D 2034/6837
See application file for complete search history.

(56) References Cited

U.S. PATENT DOCUMENTS 2,796,714 A * 6/1957 Denney .................. A01D 34/82
56/12.9
3,415,043 A * 12/1968 Shones .................. A01D 34/82
56/13.6
(Continued)

FOREIGN PATENT DOCUMENTS

WO 2016109860 A2 7/2016

OTHER PUBLICATIONS

International Search Report and Written Opinion for International Application No. PCT/IB2019/059309 dated May 13, 2020.
(Continued)

*Primary Examiner* — Adam J Behrens
(74) *Attorney, Agent, or Firm* — Burr & Forman LLP (57) ABSTRACT

A lawn mower may include a blade housing configured to house at least a first blade and a second blade, a shaft disposed to rotate within the blade housing, a powerhead configured to selectively turn the shaft responsive to application of power from a power source, and a blade coupler configured to selectively couple the first blade and/or the second blade to the shaft to produce different cutting performance conditions based on which of the first blade and/or the second blade is operably coupled to the shaft.

20 Claims, 7 Drawing Sheets

(56) References Cited

U.S. PATENT DOCUMENTS

| | | | |
|---|---|---|---|
| 4,407,112 A | 10/1983 | Shepherd et al. | |
| 4,622,807 A * | 11/1986 | Reymann | A01D 34/6806 56/12.9 |
| 4,916,887 A * | 4/1990 | Mullet | A01D 34/66 56/320.2 |
| 5,012,633 A * | 5/1991 | Ito | A01D 43/077 56/12.9 |
| 5,209,052 A * | 5/1993 | Carroll | A01D 34/73 56/DIG. 17 |
| 5,809,765 A * | 9/1998 | Hastings | A01D 34/005 56/DIG. 17 |
| 6,062,013 A | 5/2000 | Wolske | |
| 9,480,200 B1 * | 11/2016 | Patridge | A01D 34/66 |
| 10,349,576 B1 * | 7/2019 | Jones | A01D 34/733 |
| 2005/0081499 A1 * | 4/2005 | Serdan | A01B 71/04 56/295 |
| 2007/0074497 A1 * | 4/2007 | Myers | A01D 34/73 56/295 |
| 2015/0359171 A1 * | 12/2015 | Butler | A01D 34/005 56/295 |
| 2016/0021817 A1 * | 1/2016 | Rojas | A01D 34/733 56/295 |
| 2017/0006774 A1 * | 1/2017 | Benavides | A01D 34/733 |
| 2017/0156261 A1 | 6/2017 | Ito et al. | |
| 2019/0045707 A1 * | 2/2019 | Patridge | A01D 34/733 |
| 2019/0104678 A1 | 4/2019 | Schaedler et al. | |

OTHER PUBLICATIONS

International Search Report and Written Opinion from related international application No. PCT/IB2019/059309 dated May 13, 2020, all pages cited in its entirety.

* cited by examiner

LAWN MOWER WITH SELECTIVELY ROTATABLE CUTTING BLADES

CROSS REFERENCE TO RELATED APPLICATION

This application claims priority to U.S. application No. 62/908,095 filed Sep. 30, 2019, the entire contents of which are hereby incorporated by reference in its entirety.

TECHNICAL FIELD

Example embodiments generally relate to outdoor power equipment and, more particularly, relate to a lawn mower with multiple blades that are operable to provide different functions and/or power consumption profiles.

BACKGROUND

Yard maintenance tasks are commonly performed using various tools and/or machines that are configured for the performance of corresponding specific tasks. Certain tasks, like grass cutting, are typically performed by lawn mowers. Lawn mowers themselves may have many different configurations to support the needs and budgets of consumers. Walk-behind lawn mowers are typically relatively compact, have comparatively small engines and are relatively inexpensive. Robotic mowers can be even smaller, and operate autonomously. Meanwhile, at the other end of the spectrum, riding lawn mowers, such as lawn tractors, can be quite large.

Although each of these different types of mowers clearly has significant differences in weight, size, cost and sometimes also capabilities, they are all generally constructed around the same basic principle of operation. In this regard, a power source is used to enable a power unit (e.g., a motor or engine) to provide the motive force that causes blades to rotate on a shaft and cut grass. Gasoline or petrol engines had been dominant means by which to provide the motive force for rotating the blades for many years. However, more recently, battery powered devices have been becoming more prominent.

Practical limitations had initially effectively restricted battery power to applications in smaller devices such as robotic mowers. However, battery technology advances gradually enabled walk behind mowers to also be battery powered. Now, even riding lawn mowers such as lawn tractors and mowers with zero (or near zero) turn radius are also being designed to be powered by battery.

Given these (and future) advances in battery technology, it should be expected that more and more battery powered models of lawn mowers (i.e., electric mowers) will hit the market. Product costs for electric mowers are directly related to the battery size and the charger capacity for the charger that is used to charge the battery. Accordingly, finding innovative solutions for reducing power consumption, while also minimizing impact on the quality of the cut provided by the electric lawn mower will provide cost and performance advantages within this context.

BRIEF SUMMARY OF SOME EXAMPLES

Some example embodiments may therefore provide for improved power management capabilities for lawn mowers.

In an example embodiment, a lawn mower may be provided. The lawn mower may include a blade housing configured to house at least a first blade and a second blade, a shaft disposed to rotate within the blade housing, a powerhead configured to selectively turn the shaft responsive to application of power from a power source, and a blade coupler configured to selectively couple the first blade and/or the second blade to the shaft to produce different cutting performance conditions based on which of the first blade and/or the second blade is operably coupled to the shaft.

In another example embodiment, a power management assembly for controlling rotation of blades of a blade assembly responsive to operation of a powerhead of a lawn mower may be provided. The power management assembly may include a first blade disposed within the blade housing and selectively operably coupled to a shaft, a second blade disposed within the blade housing and selectively operably coupled to the shaft, and a blade coupler configured to selectively couple the first blade and/or the second blade to the shaft to produce different cutting performance conditions based on which of the first blade and/or the second blade is operably coupled to the shaft.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

Figure 1:
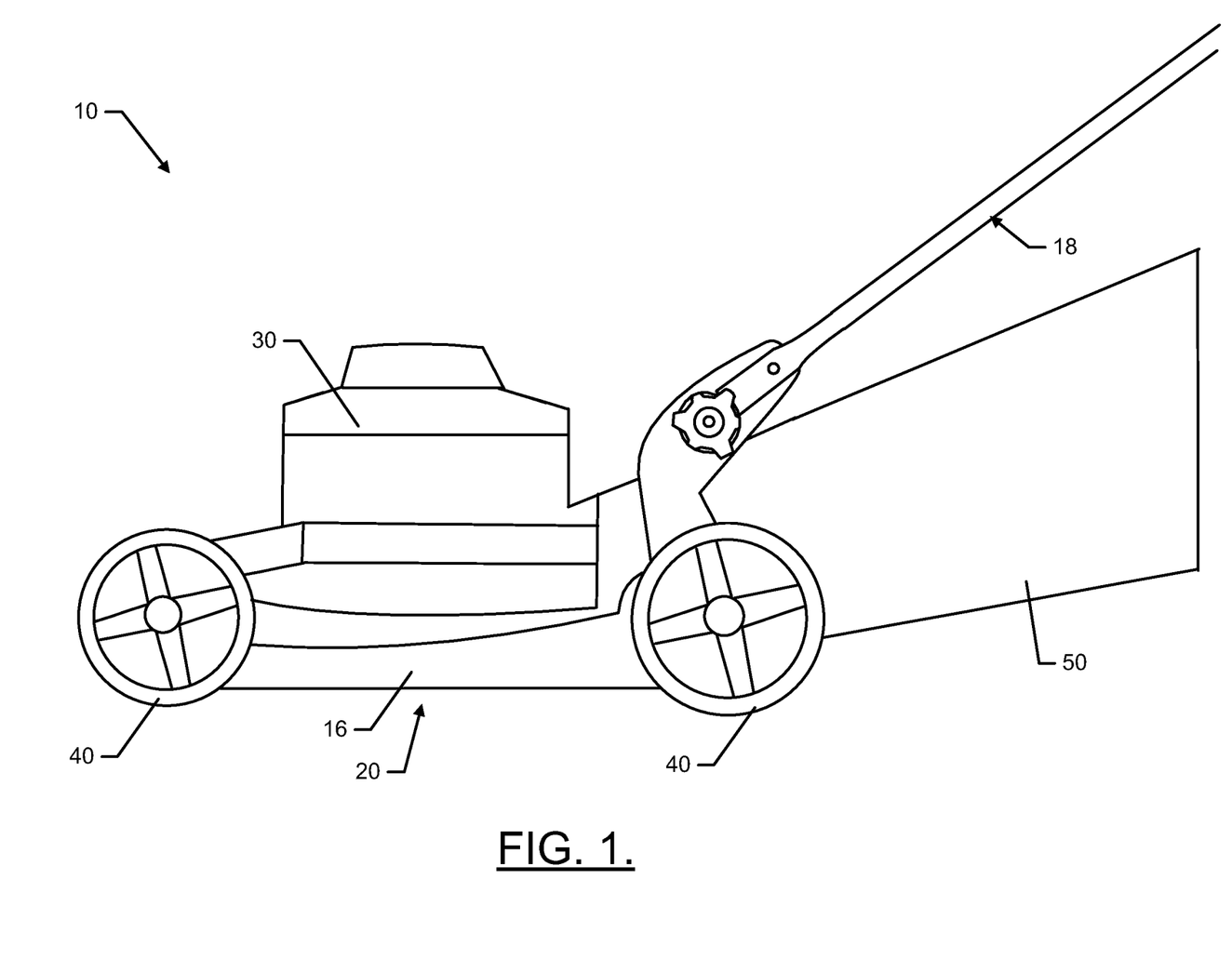
FIG. 1 illustrates a side view of a lawn mower that may employ a power management assembly according to an example embodiment.

FIG. 1 illustrates a side view of a walk-behind lawn mower 10 of an example embodiment. However, it should be appreciated that the walk-behind lawn mower 10 is just one example of an outdoor power equipment device on which an example embodiment may be practiced. In other examples, the outdoor power equipment device could be a riding lawn mower or a robotic lawn mower of any type. For this example, an operator may be located at an operator station located behind the lawn mower 10. However, for a riding lawn mower, the operator may ride on a seat at either a forward, middle or rear portion of the device. For the robotic lawn mower, there may not be an operator actively involved in operation of the device during cutting operations, as the robotic lawn mower may be capable of autonomous operation.

The lawn mower 10 of FIG. 1 includes a blade housing 16 to which a handle assembly 18 is attached. The operator station may be at a distal end of the handle assembly 18 relative to the blade housing 16. The blade housing 16 may house a blade assembly 20 (see also FIG. 2) having more than one rotatable cutting blade. The cutting blades may be suspended above the ground via one or more instances of a rotatable shaft (e.g., a drive shaft—not shown in FIG. 1) that may be turned responsive to operation of a powerhead 30, such as an electric motor. Operation of the powerhead 30 may be initiated by a key, switch, electronic ignition or other similar device. In some cases, the key, switch, electronic ignition or the like may be located at the powerhead 30. However, in other cases, the key, switch, electronic ignition or the like may be located at the operator station.

The lawn mower 10 may include a mobility assembly on which a substantial portion of the weight of the lawn mower 10 may rest when the lawn mower 10 is stationary. The mobility assembly may also provide for movement of the lawn mower 10. In some cases, the mobility assembly may be driven via power from the powerhead 30 that may be selectively provided to ground engaging wheels 40, which make up the mobility assembly. In other cases, the wheels 40 may simply roll responsive to a push force from the operator. In some examples, the wheels 40 may be adjustable in their respective heights. Adjusting the height of the front wheels and/or the back wheels may be employed in order to provide a level cut and/or to adjust the height of the cutting blade. In some embodiments, a local wheel height adjuster may be provided at the front wheels and/or the back wheels. However, in other embodiments, remote wheel height adjustment may also or alternatively be possible (e.g., from the operator station or elsewhere on the lawn mower 10).

Rotation of the cutting blades of the cutting assembly 20 may generate grass clippings, and/or other debris that may be ejected from the blade housing 16. In some cases, the clippings/debris may be ejected from a side or rear of the blade housing 16. When a rear discharge is employed, many such lawn mowers may employ a collector 50 to collect discharged clippings/debris. However, collectors may also be used for side discharge models in some cases. The collector 50 may be removable to enable the operator to empty the collector 50, and the collector 50 may be made of fabric, plastic or other suitable materials.

As noted above, example embodiments may also be practiced with robotic lawn mowers and riding lawn mowers. In such cases, the components discussed above may be included (or modified) along with other components to form the robotic lawn mower or riding lawn mower. Thus, the components of FIG. 1 are merely provided as non-limiting examples of some of the components that may be common to lawn mowers that may employ the technology associated with example embodiments.

Figure 2:
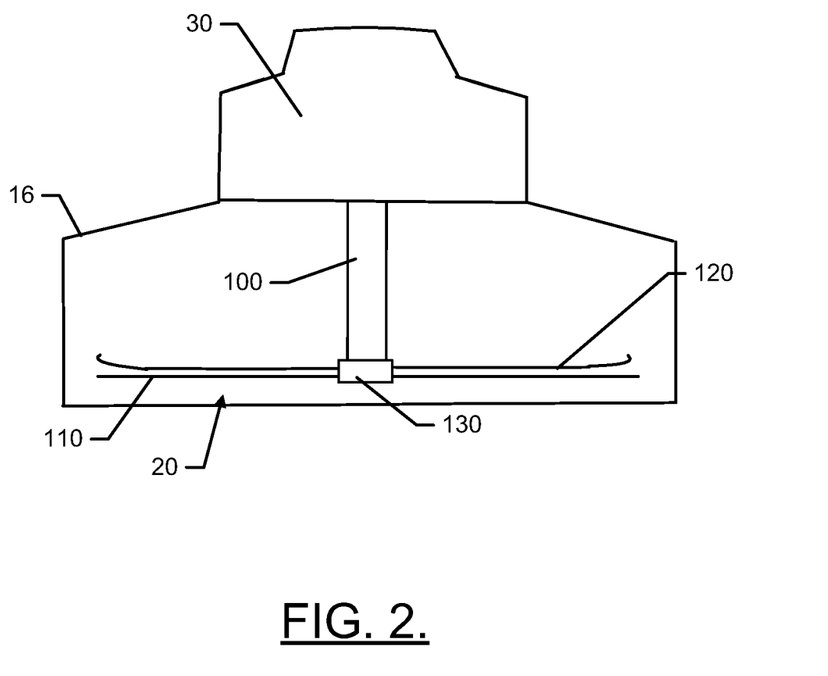
FIG. 2 illustrates a partially cut-away side view of a blade housing of the lawn mower according to an example embodiment.
Figure 3:
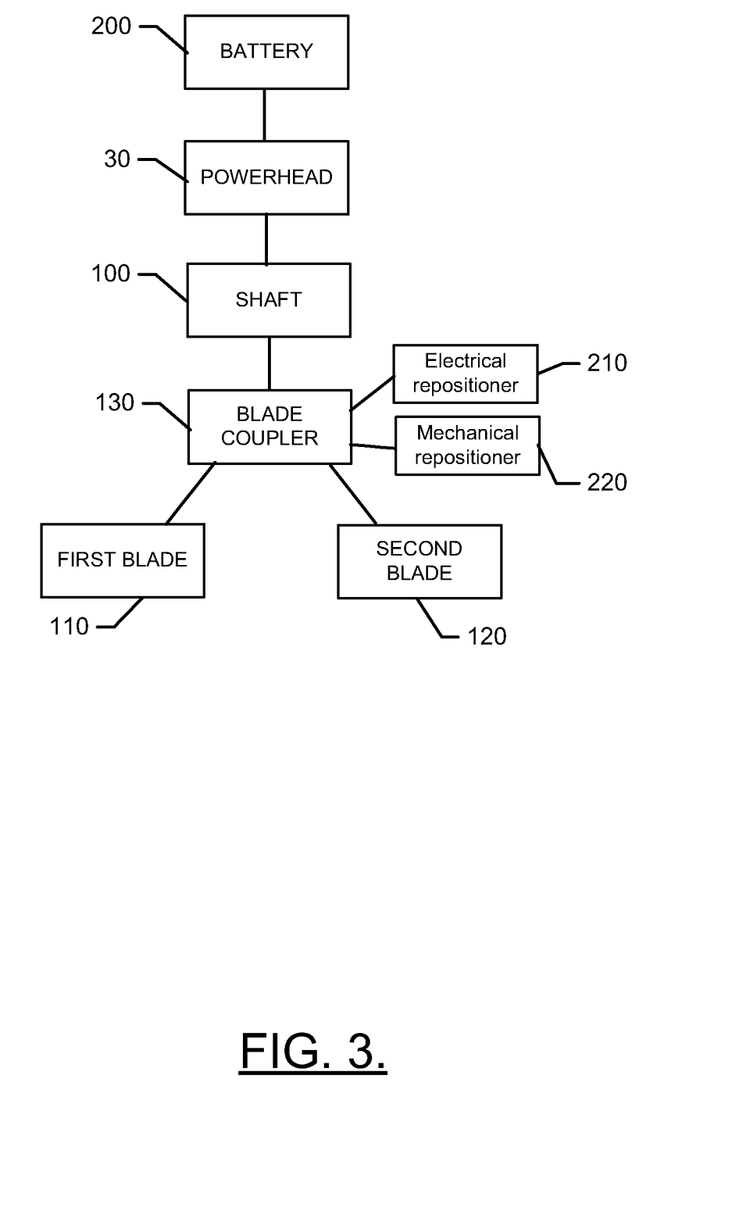
FIG. 3 illustrates a block diagram of the power management assembly in accordance with an example embodiment.

FIG. 2 illustrates a partially cutaway view of the inside of the blade housing 16 of FIG. 1. Meanwhile, FIG. 3 illustrates a functional block diagram of various components of a multi-blade mower according to an example embodiment. It should be appreciated that generic housings associated with robotic lawn mowers or riding lawn mowers could easily be substituted for the blade housing 16 in other example embodiments. In the examples of FIGS. 2 and 3, the powerhead 30 is battery powered from battery 200. Although the powerhead 30 is battery powered in this example, it should be appreciated that the powerhead 30 could alternatively be powered by a gasoline or petrol engine and example embodiments described herein could still be employed. When battery powered, the battery 200 may be a rechargeable battery that can be charged at a charging station (not shown). In an example embodiment, the powerhead 30 may be operably coupled to (and selectively power or turn) shaft 100. Shaft 100 is then selectively coupled to either one or both of the blades of the blade assembly 20. The blades of the blade assembly 20 include a first blade 110 and a second blade 120. However, it should be appreciated that the blade assembly 20 could also include additional blades (e.g., multiple vertically stacked blades). The first and second blades 110 and 120 (along with any additional blades if more than two are employed) are each operably coupled to the shaft 100 via a blade coupler 130. In an example embodiment, the first and second blades 110 and 120 may be blades that are each of a different type at least in terms of their energy consumption and/or cutting characteristics. For example, one blade may be used for better mulching capability, and the other may be used for better discharge or bagging capability. The different characteristics of the blades may also include having different lengths. For example, the first blade 110 may be a 21 inch blade, and the second blade 120 may be an 18 inch blade. Other structural differences that impact energy consumption and/or cutting characteristics may also be employed in some alternative embodiments.

In some cases, the first blade 110 (e.g., the blade located closest to the ground and therefore having the lowest elevation relative to the ground) may be a low flow and/or low energy blade. In other words, the first blade 110 may be shaped or otherwise designed to generate a relatively low amount of airflow and flow energy responsive to rotation thereof. A flat blade design may provide such a low flow, low energy profile. In this regard, since a flat blade design encounters less air as it rotates, the amount of flow energy is minimized. The flat blade may therefore be relatively easy to turn and consume less energy. Meanwhile, the flat blade may also generate less flow energy and therefore provide less capability for driving the flow of clippings into, for example, the collector 50 of FIG. 1. The flat blade may therefore be a better blade for mulching operations.

In some cases, the second blade 120 (e.g., the blade located farthest away from the ground and therefore having the highest elevation relative to the ground) may be high flow and/or high energy blade. In other words, the second blade 120 may be shaped or otherwise designed to generate a relatively high amount of airflow and flow energy responsive to rotation thereof. A winged blade design may provide such a high flow, high energy profile. In this regard, since a winged blade design has uneven surfaces (e.g., some of which may be created by "wing" structures on the blade or near the distal ends thereof), the winged blade encounters more air as it rotates, thereby generating turbulent flow and increasing the amount of flow energy generated by rotation of the blade. The winged blade may therefore be relatively harder to turn and consume more energy. Meanwhile, the winged blade may also generate more flow energy and therefore provide increased capability for driving the flow of clippings into, for example, the collector 50 of FIG. 1. The winged blade may therefore be a better blade for discharge and bagging operations.

The first and second blades 110 and 120 may be positioned coaxially (e.g., with the shaft 100 forming the common axis thereof) in a vertically stacked arrangement. Thus, for example, the separation between the first and second blades 110 and 120 may be provided using vertical separation. In other words, the second blade 120 may be mounted at a higher elevation (i.e., farther from the distal end of the shaft 100 than the first blade 110) than the first blade 110. In some example embodiments, the vertical space between the first and second blades 110 and 120 may be less than one inch. Moreover, in some cases, the vertical space may be about ⅛ inch or in the range of ½ inch to 1/16 inch.

In some cases, the first and second blades 110 and 120 may each be capable of being selectively coupled to the shaft 100 to rotate therewith based on a position or arrangement of the blade coupler 130. For example, the blade coupler 130 may have a first position in which the blade coupler 130 only physically engages or couples the first blade 110 to the shaft 100, a second position in which the blade coupler 130 only physically engages or couples the second blade 120 to the shaft 100, and a third position in which the blade coupler 130 physically engages or couples both the first blade 110 and the second blade 120 to the shaft 100. When a respective one of the first and second blades 110 and 120 is physically engaged or coupled to the shaft 100, the respective one of the first and second blades 110 and 120 may rotate with the shaft 100. When not physically engaged or coupled to the shaft 100, the corresponding first or second blade 110 or 120 that is not coupled/engaged may be allowed to either freewheel or may not move even though the shaft 100 turns.

In an example embodiment, the blade coupler 130 may shift positions or arrangements in order to operably couple either one or both of the first and second blades 110 and 120 to the shaft 100 responsive to actuation locally or remotely. Thus, for example, the blade coupler 130 may be operable by an electrical repositioner 210 or a mechanical repositioner 220 being adjusted to make a selection regarding which blade(s) to couple to the shaft 100. One or more clutch elements, collar devices, protrusions, or other implements may be used to couple the first and second blades 110 and 120 to the shaft 100. In some cases, one of the blades may always be coupled, and the other can be optionally coupled. For example, the first blade 110 may always be coupled to the shaft 100, and the second blade 120 can optionally be also coupled to the shaft 100. As an alternative, the second blade 120 may always be coupled to the shaft 100, and the first blade 110 can optionally be also coupled to the shaft 100. As another alternative, each of the first and second blades 110 and 120 may be optionally coupled to the shaft 100 either alone or in combination with the other blade.

The mechanical repositioner 220 may physically extend a detent, protrusion, or other coupling member from the shaft 100 and into a portion of the blade (or vice versa) in order to operably couple the two in response to the mechanical repositioner 220 being operated. The electrical repositioner 210 may electrically or magnetically operate to extend a detent, protrusion, or other coupling member or magnetically couple components of the blade to the shaft 100 (or vice versa). In some cases, the electrical positioner 210 or mechanical positioner 220 may further include a brake mechanism for friction coupling that stops or slows a non-selected blade. For example, if the electrical positioner 210 or mechanical positioner 220 is operated to select the first blade 110 for rotation with the shaft 100, the second blade 120 may also be engaged (e.g., by the brake mechanism or friction coupling) in order to slow or stop the second blade 120.

Figure 4:
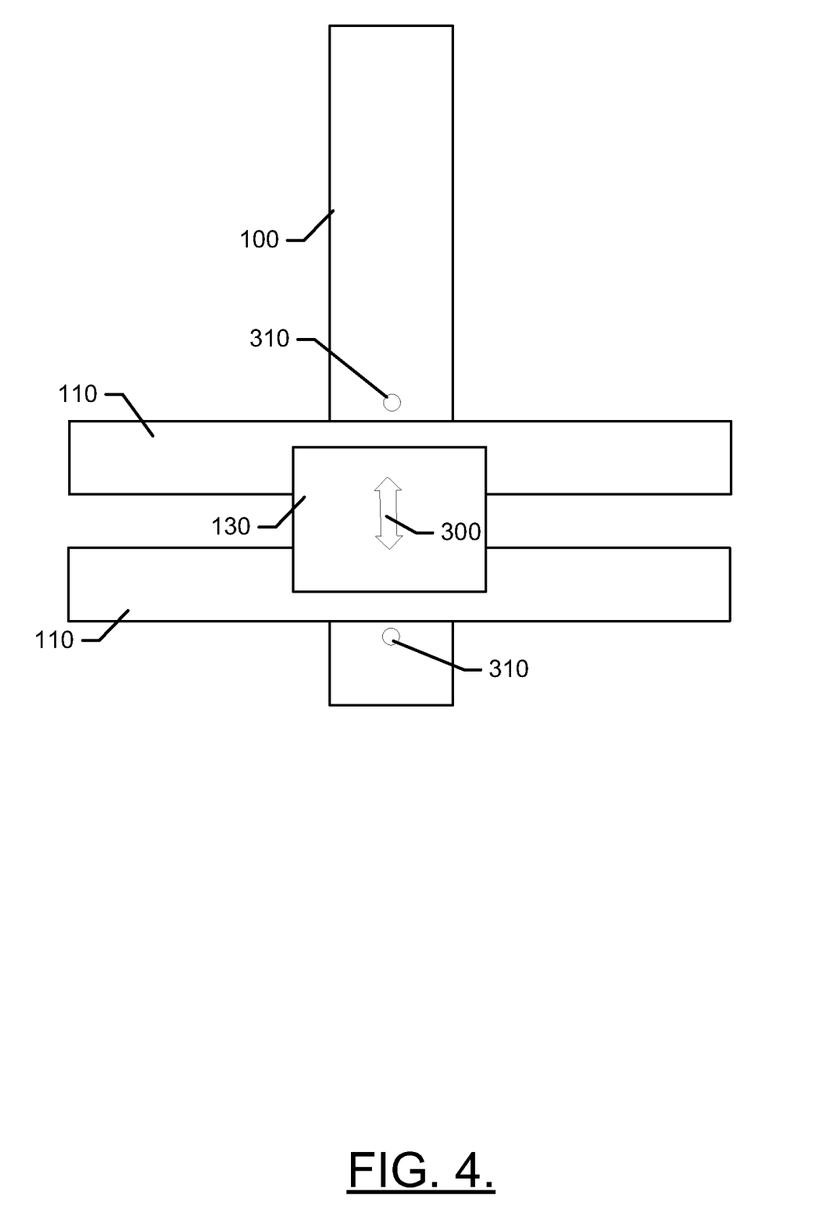
FIG. 4 illustrates a side view of the blades and blade coupler of the power management assembly in a first position according to an example embodiment.
Figure 5:
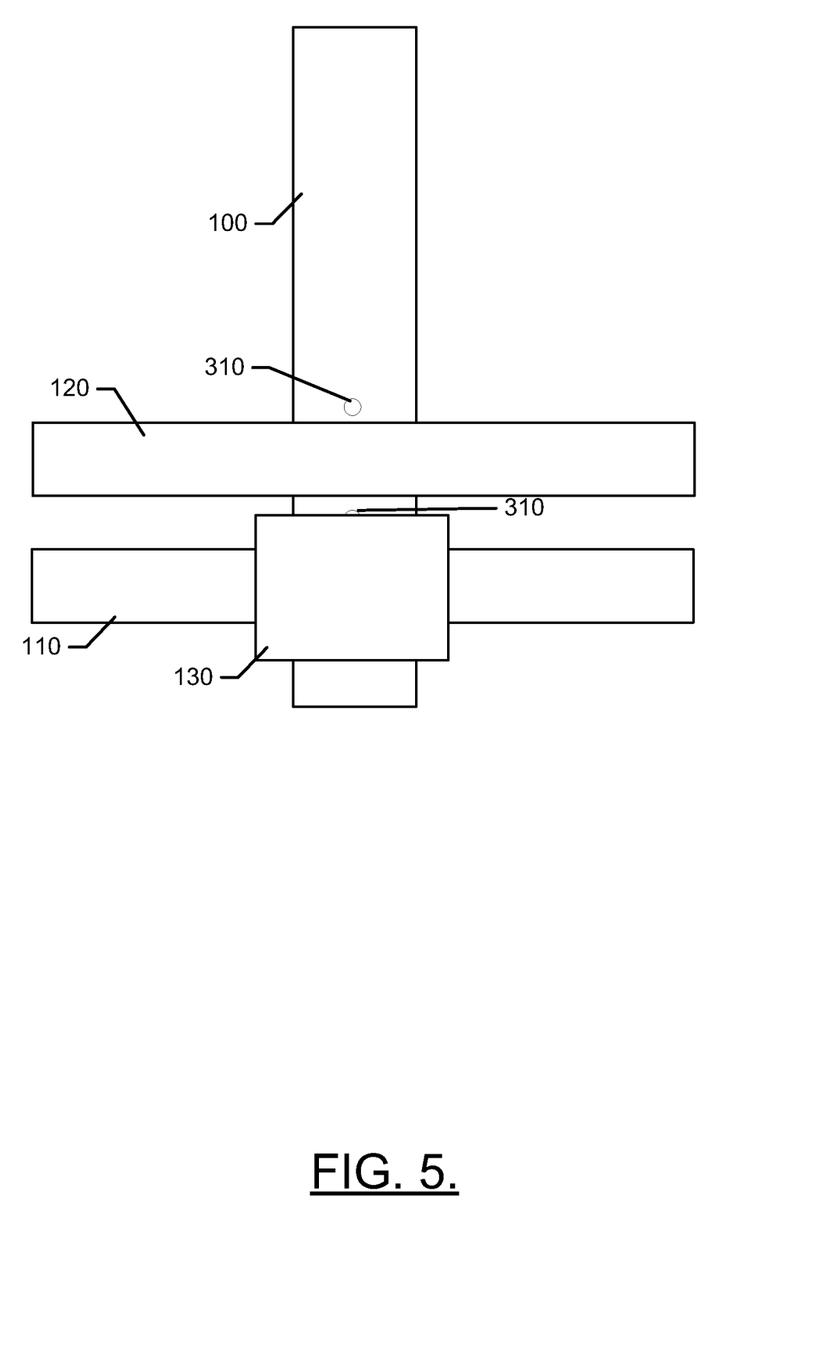
FIG. 5 illustrates a side view of the blades and blade coupler of the power management assembly in a second position according to an example embodiment.
Figure 6:
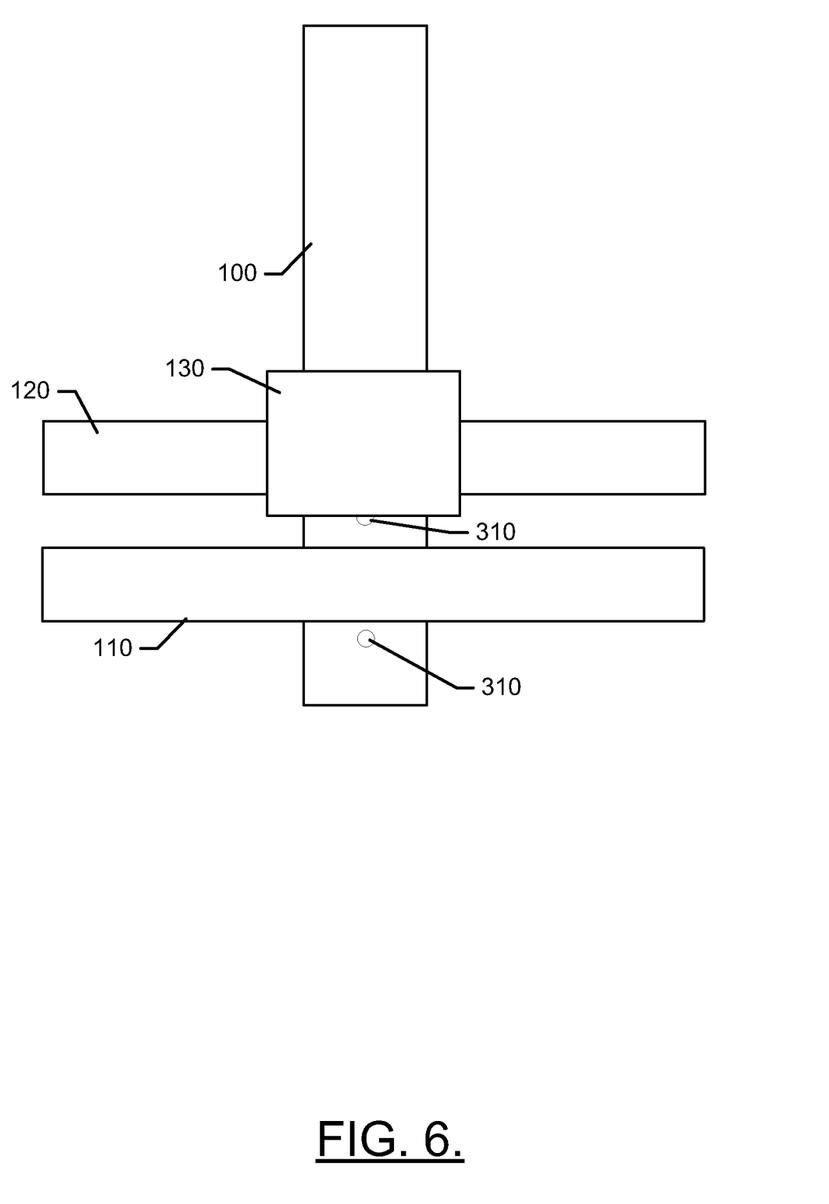
FIG. 6 illustrates a side view of the blades and blade coupler of the power management assembly in a third position according to an example embodiment.

FIGS. 4-6 illustrate a side view of a portion of the first and second blades 110 and 120 on the shaft 100 along with a vertically movable example of the blade coupler 130. In this example, the blade coupler 130 may be moved vertically along the shaft 100 in order to be positioned in one of three horizontally distinct positions. In this regard, arrow 300 in FIG. 4 illustrates that the blade coupler 130 could be moved upward or downward from the position shown. However, it should be appreciated that in the position shown in FIG. 4, the blade coupler 130 contacts both the first blade 110 and the second blade 120, and couples both simultaneously to the shaft 100 so that both the first blade 110 and the second blade 120 will rotate with the shaft 100. Of note, the shaft 100 may have one or more orifices 310 disposed along the shaft 100. The blade coupler 130 may include a protrusion (not shown) that may fit into an instance of the orifice 310 to fix the blade coupler 130 to the shaft 100. The blade coupler 130 may also include a fitting arrangement with any blade with which the blade coupler 130 is in contact in order to carry the corresponding blade with the blade coupler 130 responsive to movement of the shaft 100. Thus, for example, in FIG. 4, the blade coupler 130 engages (and therefore carries) each of the first and second blades 110 and 120 when the shaft 100 rotates.

In the example of FIG. 5, the blade coupler 130 has been vertically shifted downward in order to only engage the first blade 110 to the shaft 100. Meanwhile, in the example of FIG. 6, the blade coupler 130 has been vertically shifted upward in order to only engage the second blade 120 to the shaft 100. Accordingly, the examples of FIGS. 4-6 illustrate three separate coupling states that can be achieved by three different distinct vertical repositionings of the blade coupler 130. As noted above, the three different vertical positions of the blade coupler 130 may each correspond to a respective different engagement state with the blades of the blade assembly 20, and the three different vertical positions can be achieved by operation of either an electrical repositioner 210 or a mechanical repositioner 220. However, it should be appreciated that fewer states (e.g., two states) could be used in some cases, as also explained above. Moreover, different structures for the blade coupler 130 may also be used in alternative embodiments.

Figure 7:
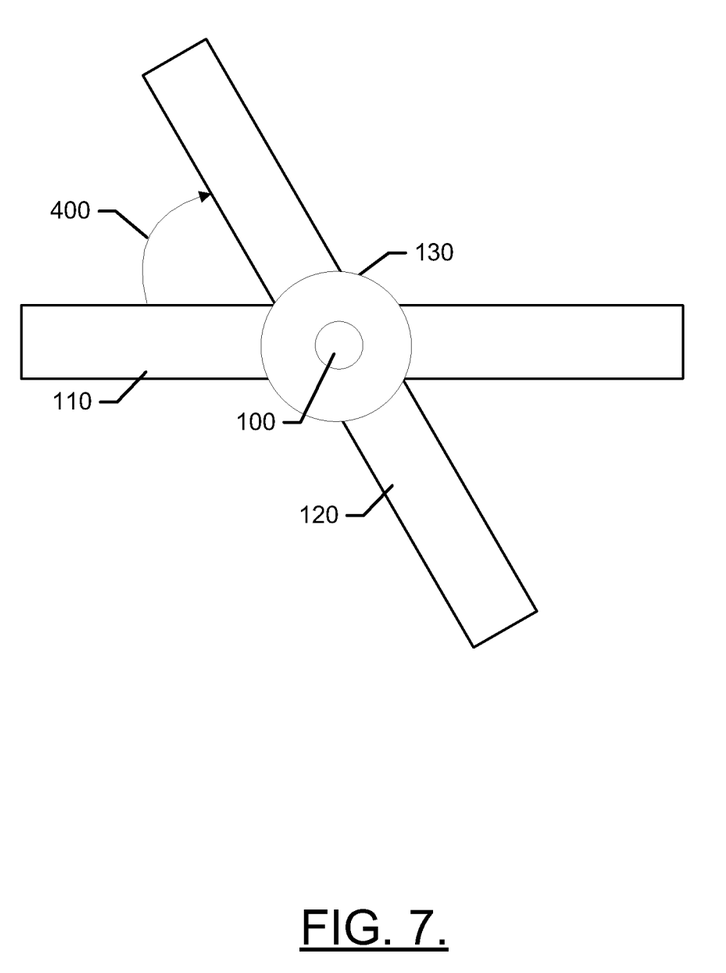
FIG. 7 illustrates a bottom view of the blades and blade coupler of the power management assembly according to an example embodiment.

FIG. 7 illustrates a bottom view (i.e., looking upward from the ground) of the blade assembly 20, and shows how the blade coupler 130 may also be coaxial with the shaft 100 in some cases to engage the portion of any blade that the blade coupler 130 has vertical overlap with. As can also be appreciated from the example of FIG. 7, the blade coupler 130 may maintain a lag angle 400 between the first and second blades 110 and 120 during rotation of the shaft 100. In the example of FIG. 7, the lag angle 400 is about 60 degrees. However, the lag angle 400 could be any desired angle between 0 and 180 degrees. In still other examples, the lag angle 400 may be variable since the blade coupler 130 may be configured to provide a slip engagement with one of the first blade 110 or the second blade 120 and fixed engagement with the other. In such an example, the slip engagement may be provided by a frictional coupling that carries the slip engaged blade at a lower speed than the speed of the shaft 100 as the shaft 100 turns. Thus, the two blades may turn at different speeds even through driven by the same shaft 100.

The blade coupler 130 may also be configured in different ways in order to allow different speed rotation of the blades. For example, the blade coupler 130 may be embodied as or include a gearbox having individual brackets for supporting each of the first and second blades 110 and 120, respectively. The brackets may then be operably coupled to the shaft 100 via respective gear sets that may be configured to turn the respective ones of the first and second blades 110 and 120 at corresponding same or different speeds from each other and with respect to the shaft 100. Moreover, the first and second blades 110 and 120 could also be configured via the respective gear sets to turn in different directions.

Accordingly, a lawn mower of an example embodiment may include a blade housing configured to house at least a first blade and a second blade, a shaft disposed to rotate within the blade housing, a powerhead configured to selectively turn the shaft responsive to application of power from a power source (e.g., a battery or gas/petrol engine), and a blade coupler configured to selectively couple the first blade and/or the second blade to the shaft to produce different cutting performance conditions based on which of the first blade and/or the second blade is operably coupled to the shaft.

In some embodiments, the features described above may be augmented or modified, or additional features may be added. These augmentations, modifications and additions may be optional and may be provided in any combination. Thus, although some example modifications, augmentations and additions are listed below, it should be appreciated that any of the modifications, augmentations and additions could be implemented individually or in combination with one or more, or even all of the other modifications, augmentations and additions that are listed. As such, for example, the first blade and the second blade may each be of a different type in terms of energy consumption or cutting characteristics. In an example embodiment, the first blade may be a low energy, low flow blade and the second blade may be a high energy, high flow blade. In some cases, the first blade may be a flat blade and the second blade may be a winged blade. In an example embodiment, the blade coupler may permanently couple one of the first blade or the second blade to the shaft, and may be configured to optionally couple the other of the second blade or the first blade to the shaft. In some cases, the blade coupler may be configured to be positioned to couple only the first blade to the shaft, couple only the second blade to the shaft and couple both the first blade and the second blade to the shaft in three respective different positions of the blade coupler. In an example embodiment, the blade coupler may be configured to be movable vertically to selectively engage the first blade and the second blade alone or in combination with each other. In some cases, the blade coupler may be movable responsive to operation of a mechanical positioner. In an example embodiment, the blade coupler may be movable responsive to operation of an electrical positioner. In some cases, the blade coupler may be configured to engage the first and second blades such that a lag angle is defined between the first blade and the second blade. In an example embodiment, the lag angle may be between 0 degrees and 180 degrees. In some cases, the lag angle changes due to a slip arrangement provided between the blade coupler and one of the first blade or the second blade.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A lawn mower comprising:
   a blade housing configured to house at least a first blade and a second blade;
   a shaft disposed to rotate within the blade housing and configured to operably couple the first blade and the second blade with a vertical separation defining a distance between the first blade and the second blade;
   a powerhead configured to selectively turn the shaft responsive to application of power from a power source; and
   a blade coupler configured to selectively rotationally operably couple the first blade and/or the second blade to the shaft to produce different cutting performance conditions based on which of the first blade and/or the second blade is rotationally operably coupled to the shaft;
   wherein the first blade and the second blade are each of a different type in terms of energy consumption or cutting characteristics; and
   wherein the blade coupler is configured to be movable vertically while the first blade and the second blade remain separated by the vertical separation, to selectively engage the first blade and the second blade alone or in combination with each other.

2. The lawn mower of claim 1, wherein the first blade is a low energy, low flow blade and the second blade is a high energy, high flow blade.

3. The lawn mower of claim 2, wherein the first blade is a flat blade and the second blade is a winged blade.

4. The lawn mower of claim 1, wherein one of the first blade or the second blade is always rotationally operably coupled to the shaft, and the blade coupler is configured to optionally rotationally operably couple the other of the second blade or the first blade to the shaft.

5. The lawn mower of claim 1, wherein the blade coupler is configured to be positioned to couple only the first blade to the shaft, couple only the second blade to the shaft and couple both the first blade and the second blade to the shaft in three respective different positions of the blade coupler.

6. The lawn mower of claim 1, wherein the blade coupler is movable responsive to operation of a mechanical positioner.

7. The lawn mower of claim 1, wherein the blade coupler is movable responsive to operation of an electrical positioner.

8. The lawn mower of claim 1, wherein the blade coupler is configured to engage the first and second blades such that a lag angle is defined between the first blade and the second blade.

9. The lawn mower of claim 8, wherein the lag angle is between 0 degrees and 180 degrees.

10. The lawn mower of claim 8, wherein the lag angle changes due to a slip arrangement provided between the blade coupler and one of the first blade or the second blade.

11. A power management assembly for controlling rotation of blades responsive to operation of a powerhead of a lawn mower, the power management assembly comprising:
   a first blade disposed within a blade housing and selectively operably coupled to a shaft;
   a second blade disposed within the blade housing and selectively operably coupled to the shaft; and
   a blade coupler configured to selectively rotationally operably couple the first blade and/or the second blade to the shaft to produce different cutting performance conditions based on which of the first blade and/or the second blade is rotationally operably coupled to the shaft;
   wherein the shaft is configured to operably couple the first blade and the second blade with a vertical separation defining a distance between the first blade and the second blade,
   wherein the first blade and the second blade are each of a different type in terms of energy consumption or cutting characteristics; and
   wherein the blade coupler is configured to be movable vertically while the first blade and the second blade remain separated by the vertical separation, to selectively engage the first blade and the second blade alone or in combination with each other.

12. The power management assembly of claim 11, wherein the first blade is a low energy, low flow blade and the second blade is a high energy, high flow blade.

13. The power management assembly of claim 12, wherein the first blade is a flat blade and the second blade is a winged blade.

14. The power management assembly of claim 11, wherein one of the first blade or the second blade is always rotationally operably coupled to the shaft, and the blade coupler is configured to optionally rotationally operably couple the other of the second blade or the first blade to the shaft.

15. The power management assembly of claim 11, wherein the blade coupler is configured to be positioned to couple only the first blade to the shaft, couple only the second blade to the shaft and couple both the first blade and the second blade to the shaft in three respective different positions of the blade coupler.

16. The power management assembly of claim 11, wherein the blade coupler is movable responsive to operation of a mechanical positioner.

17. The power management assembly of claim 11, wherein the blade coupler is movable responsive to operation of an electrical positioner.

18. The power management assembly of claim 11, wherein the blade coupler is configured to engage the first and second blades such that a lag angle is defined between the first blade and the second blade.

19. The power management assembly of claim 18, wherein the lag angle is between 0 degrees and 180 degrees.

20. The power management assembly of claim 18, wherein the lag angle changes due to a slip arrangement provided between the blade coupler and one of the first blade or the second blade.

* * * * *